United States Patent
Arnalsteen et al.

(10) Patent No.: US 8,485,215 B2
(45) Date of Patent: Jul. 16, 2013

(54) LIQUID TANK VENTING SYSTEM

(75) Inventors: Michel Arnalsteen, Groot-Bijgaarden (BE); Alex Blieux, Saint Felix (FR); Vincent Cuvelier, Brussels (BE); Jerome Ropert, Laval (FR); Thierry Rouxel, Argentre (FR)

(73) Assignee: Inergy Automotive Systems Research (S.A.), Brussels (BE)

( * ) Notice: Subject to any disclaimer, the term of this patent is extended or adjusted under 35 U.S.C. 154(b) by 592 days.

(21) Appl. No.: 12/440,038

(22) PCT Filed: Sep. 12, 2007

(86) PCT No.: PCT/EP2007/059547
§ 371 (c)(1),
(2), (4) Date: Mar. 5, 2009

(87) PCT Pub. No.: WO2008/031830
PCT Pub. Date: Mar. 20, 2008

(65) Prior Publication Data
US 2009/0314357 A1 Dec. 24, 2009

(30) Foreign Application Priority Data

Sep. 13, 2006 (FR) .................................... 06 08051
Nov. 16, 2006 (FR) .................................... 06 10010

(51) Int. Cl.
*F16K 24/04* (2006.01)
(52) U.S. Cl.
USPC ........................................ 137/202; 137/448
(58) Field of Classification Search
USPC .......... 137/43, 202, 448, 451, 614.2; 220/746
See application file for complete search history.

(56) References Cited

U.S. PATENT DOCUMENTS

| | | | | |
|---|---|---|---|---|
| 1,576,331 A | * | 3/1926 | Kelley et al. | 137/202 |
| 3,938,692 A | * | 2/1976 | Crute | 137/43 |
| 4,592,100 A | * | 6/1986 | Robertson et al. | 137/614.2 |
| 4,655,238 A | * | 4/1987 | Szlaga | 137/43 |
| 4,742,840 A | * | 5/1988 | Takahashi et al. | 137/43 |
| 4,787,529 A | * | 11/1988 | Harris | 137/43 |
| 4,913,303 A | * | 4/1990 | Harris | 137/43 |
| 4,982,757 A | | 1/1991 | Ohasi et al. | |
| 5,181,497 A | * | 1/1993 | Matsushita et al. | 137/43 |
| 5,215,132 A | * | 6/1993 | Kobayashi | 220/746 |

(Continued)

FOREIGN PATENT DOCUMENTS

| EP | 1236605 A2 | 9/2002 |
|---|---|---|
| EP | 1359042 A1 | 11/2003 |

(Continued)

OTHER PUBLICATIONS

PCT International Search Report dated Dec. 10, 2007 for International Application No. PCT/EP2007/059547 (3 p.).

*Primary Examiner* — Craig Schneider
*Assistant Examiner* — Craig J Price
(74) *Attorney, Agent, or Firm* — Oblon, Spivak, McClelland, Maier & Neustadt, L.L.P.

(57) ABSTRACT

Liquid tank venting system comprising a chamber that is inside the tank and that is equipped with a drainage device that comprises at least one opening made in the chamber and an elastomer-based non-return valve capable of sealing/freeing this opening, according to which this non-return valve is forced into a position for leaktight closure of the opening via a specific device starting from a certain liquid level in the tank.

5 Claims, 2 Drawing Sheets

U.S. PATENT DOCUMENTS

| | | | |
|---|---|---|---|
| 5,573,030 A * | 11/1996 | Ohsaki et al. | 137/43 |
| 5,582,198 A * | 12/1996 | Nagino et al. | 137/43 |
| 5,638,856 A | 6/1997 | Ohsaki | |
| 5,988,201 A * | 11/1999 | Lebkuchner et al. | 137/202 |
| 6,145,532 A * | 11/2000 | Tuckey et al. | 137/202 |
| 6,336,466 B1 | 1/2002 | Ganachaud et al. | |
| 6,532,983 B2 | 3/2003 | Ganachaud | |
| 6,612,324 B2 * | 9/2003 | Szlaga | 137/202 |
| 6,848,463 B2 * | 2/2005 | Johansen | 137/202 |
| 7,543,597 B2 * | 6/2009 | Leonhardt | 137/202 |
| 2002/0062861 A1 | 5/2002 | Devall | |
| 2003/0189110 A1 | 10/2003 | Kurihara et al. | |
| 2005/0229967 A1 | 10/2005 | Ueki | |
| 2006/0213555 A1 * | 9/2006 | Miura et al. | 137/202 |

FOREIGN PATENT DOCUMENTS

| | | |
|---|---|---|
| JP | 59034932 A | 2/1984 |
| JP | 2000145991 A | 5/2000 |
| JP | 2000145992 A | 5/2000 |
| WO | WO 2006040278 A1 | 4/2006 |
| WO | WO 2006125751 A1 | 11/2006 |

* cited by examiner

LIQUID TANK VENTING SYSTEM

CROSS-REFERENCE TO RELATED APPLICATIONS

This application is a U.S. national stage application under 35 U.S.C. §371 of International Application No. PCT/EP2007/059547 filed Sep. 12, 2007, which claims priority to French Application No. FR06.08051 filed Sep. 13, 2006 and to French Application No. FR06.10010 filed Nov. 16, 2006, these applications being herein incorporated by reference in their entirety for all purposes.

BACKGROUND OF THE INVENTION

The present invention relates to a liquid tank venting system.

Liquid tanks, when they are likely to be moved with the liquid that they contain, are generally equipped with a ventilation system that guarantees environmental safety when the tank is subjected to various stresses: movements in any direction and of any amplitude, thermal stresses, underpressure and overpressure.

This requirement is encountered in the case of fuel tanks, in particular when they are mounted on motor vehicles and when it is essential to prevent liquid fuel from getting out and to manage large gas pressure and volume changes when filling the tank and throughout the time that the liquid is stored in said tank.

Solutions have been developed to solve these problems that use safety valves immersed in the tank, the upper part of the valves passing through a wall of this tank. These valves generally open into a duct that leads to a box or canister containing a substance capable of trapping the liquid vapours present in the gases originating from the tank. However, it is not uncommon that systems of this type have further difficulties due to the fact that, because of the particular operating circumstances, such as sudden movements or excessively high angle of tilt of the vehicle, liquid originating from the tank may nevertheless pass through the barrier of the safety valve and get into the duct leading to the canister, or even reach the latter and disturb the free flow of the vapours.

To remedy this accidental entrainment of liquid out of the tank, thought has been given to providing said valves with an ROV (or Roll Over Valve) device that generally consists of a heavy ball or a spring connected to a float, which closes the valve in case of a vehicle rolling over, waves, etc. It has also been sought to retain the liquid that escapes via the duct leading to the canister by interposing, in this duct, a dead volume intended to act as a container for collecting the liquid and for letting the vapours pass through freely. This dead volume is generally provided with a device that allows it to be drained when the liquid level in the tank drops below a certain limit, said device furthermore preventing the ingress of liquid into said volume when the liquid level in the tank is above this limit. It is therefore also called a drainable container (or DC). Such systems (both with ROV and CV) are, for example, described in Patents EP 1 020 670 and EP 1 172 306 in the name of the Applicant. The drainage devices that are described therein are non-return valves of the umbrella valve type, which are generally based on an elastomer.

The drawback of these systems from the prior art that use a container or chamber that has to be drained at a high flow rate and that is therefore provided with relatively large aperture(s) sealed by non-return valves, is the lack of leaktightness at these valves. This is because, although this leaktightness is better with elastomer-based "flexible" systems (as in the aforementioned patents in the name of the Applicant), these however have a static leak when the valve remains immersed in the liquid for a prolonged period.

BRIEF SUMMARY OF THE INVENTION

The invention aims to overcome this drawback by providing a ventilation system with a drainable chamber that is significantly more leaktight than those of the systems of the prior art.

DETAILED DESCRIPTION OF THE INVENTION

Figure 1:
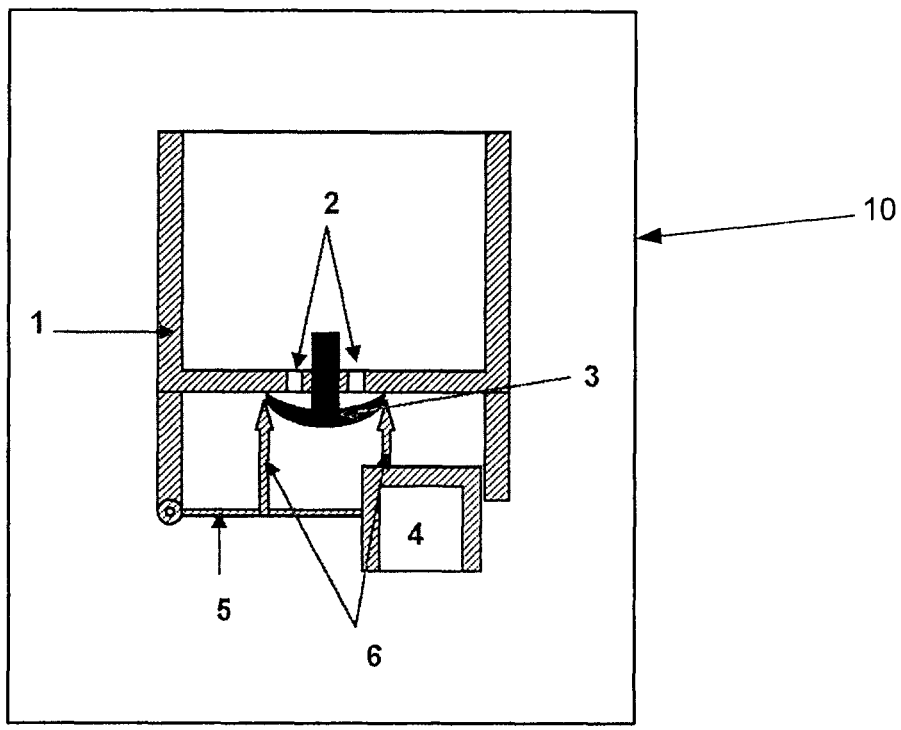
FIG. 1 is a schematic drawing of an embodiment of the present invention.

For this purpose, the invention relates to a liquid tank venting system comprising a chamber that is inside the tank and that is equipped with a drainage device that comprises at least one opening made in the chamber and a non-return valve at least partly based on an elastomer capable of sealing/freeing this opening, according to which this non-return valve is forced into a position for leaktight closure of the opening via a specific device starting from a certain liquid level in the tank.

The liquid tank is a closed volume, of various shapes, generally leaktight with respect to the outside, which may be equipped with various internal accessories or accessories that pass through its wall. The tank may contain any type of organic or inorganic liquid, or a mixture of such liquids. In particular, it is a fuel tank for motor vehicles. All types of fuel used by motor vehicles may be stored in the fuel tank such as, in particular, petrol and diesel.

The tank venting system is a device comprising several elements, the overall function of which is to allow the tank to be degassed when it is being filled and to be vented when the liquid it contains is being used and consumed, while protecting the external environment from any leak or emanation of undesirable gases.

According to the invention, the venting system comprises a chamber or closed volume inside the tank of any shape and bounded by walls that are impermeable to the liquids and gases. This volume is positioned inside the tank and communicates with it via at least one opening, and also with the venting system by means of a venting duct and/or opening. Some of the liquid present in the tank may therefore penetrate into this chamber either directly (when its level reaches one of the apertures) or indirectly (by gas entrainment through one of the apertures).

Therefore, according to the invention, this chamber comprises a drainage device consisting of at least one aperture and a non-return valve. Preferably, the aperture is located at a low point in the chamber, and the valve may open when the liquid level in the tank drops below a certain value. The chamber according to the invention may also comprise several openings capable of being sealed by the same non-return valve or by several non-return valves.

According to the invention, the non-return valve is at least partly based on elastomer(s), i.e. natural or synthetic rubber(s). Any type of elastomer may be suitable. Preferably, it is NBR or fluoroelastomers (fluorosilicone, FKM, FPM, etc.).

Any type of non-return valve may be suitable. In a first variant, this valve is located on the chamber, on the perimeter of the opening, and it comprises at least one part that can be deformed under the effect of the weight of liquid present in the chamber and the deformation of which then makes it possible to at least partly free the opening. It is preferably an umbrella valve (i.e. having a membrane that can be deformed under the effect of the weight of liquid) or a duck bill valve (i.e. having at least two lips capable of parting under the effect of the weight of liquid).

In a second variant, the non-return valve is a device located under the chamber or in an extension of it, under the opening. It may be, for example, a preloaded float or a float provided with a spring and consisting, in its upper part, of an elastomeric part capable of sealing the opening in the chamber depending on the liquid level in the tank.

According to the invention, the non-return valve is forced into a leaktight closure position via a specific device starting from a certain liquid level in the tank. This device therefore preferably comprises a closure float that can work as a function of the liquid level in the tank and that acts directly or indirectly on the deformable part of the valve (its elastomeric part) to prevent its deformation.

Generally, this elastomeric part is in the shape of an umbrella or a duck's bill.

According to a $1^{st}$ variant (1), the non-return valve is an umbrella valve located over the opening in the chamber.

According to a $1^{st}$ subvariant (1A), the device forcing its closure comprises a lever arm activated by the closure float and consisting of at least one excrescence or support capable of exerting a pressure on the edge of the umbrella starting from a certain liquid level in the tank. This excrescence may be of any shape, for example of annular shape, so as to be able to exert a continuous pressure on the perimeter of the umbrella. Alternatively, this excrescence may consist of a multitude of shafts arranged in a circle so as to be able to exert a pressure at regular intervals on the perimeter of the umbrella starting from a certain liquid level in the tank.

According to a $2^{nd}$ subvariant (1B), the device forcing the closure of the umbrella valve is an annular float provided with an apex that is also annular, the size and position of which are adapted in order to be able to press on the edge of the umbrella in the top position of the float. Preferably, this float slides into an excrescence of the chamber located under the latter and preferably centred with respect to its opening(s). This excrescence is also open or comprises an aperture (in order to be able to be drained).

According to a $2^{nd}$ variant (2), the non-return valve is a duck bill valve also located over the opening in the chamber and in the device forcing its closure comprises a secondary chamber into which the closing float slides and which furthermore is provided with a stop or support that cooperates with the closure float to pinch the lips of the duck bill starting from a certain liquid level in the tank.

According to a $3^{rd}$ variant (3), the non-return valve is a float provided with an elastomeric part in the shape of an umbrella inverted at its apex. Such a valve leaves the chamber open at rest, whereas the umbrella or duck bill valves borne by the chamber close the latter at rest. It thus has the advantage that, at rest, it lets the chamber empty automatically and that therefore it may be designed so that the contact force when it is closed is much higher, which strengthens its non-return function. In the umbrella or duck bill valves described previously (closed at rest and only opening under a certain weight of liquid) this force must be lower for fear of never being able to drain the chamber. As in the variant 2B described above, the float from variant (3) preferably slides into an excrescence of the chamber that is open or comprises an aperture, and is located under this chamber, preferably centred with respect to its opening(s).

The venting system according to the invention preferably also comprises at least one vent valve comprising a vent float which may be positioned in the chamber or outside of it. The expression "float vent valve" is understood to mean a device that allows ventilation of the tank using a valve controlled by the displacement of a float caused by the level of liquid present in the tank.

According to a first variant, the system comprises a float vent valve that is separate from the chamber and connected to it by a ventilation duct. This vent valve may be a ROV or an FLVV (Fill Limit Vent Valve) or valve generally comprising a float capable of sealing a connection aperture between the tank and the venting circuit when the maximum fill level is reached, thus causing a pressure increase in the tank and the release of the fill nozzle.

In this case, the role of the chamber is to constitute a container capable of collecting and retaining any liquid entrainment originating from the tank which could have passed through the barrier of the valve. The volume of this container is chosen to be of sufficient size to collect all liquid entrainment liable to pass through the barrier of the valve during particular circumstances, especially when the tank is full or close to its maximum fill level. This volume also depends on the dimensions and the design itself of the valve and also on the diameter of the duct connecting it to the valve.

In this case, the chamber generally comprises three apertures: one communicating with the inside of the tank and provided with the drainage device according to the invention; one connecting it to the vent valve; and another connecting it to another part of the ventilation system (for example, the duct to the canister). Full details relating to this variant appear in the aforementioned EP patents in the name of the Applicant, the content of which is incorporated by reference into the present application.

According to a $2^{nd}$ variant, the float vent valve is integrated into the chamber. In this case, the vent valve is preferably an ROV. It may however also be an FLVV like that described in the aforementioned US patents, the content of which is incorporated by reference into the present application. In this case, generally, the chamber comprises at least one overflow opening, at least one purge aperture provided with a drainage device according to the invention and at least one aperture connecting it to the venting circuit.

The present invention also relates to a fuel tank equipped with a venting system as described previously.

The purpose of the appended FIGS. 1 to 4 is to illustrate the invention, without in any way limiting its scope. In these figures, identical numbers represent identical or similar components.

FIG. 1 represents a schematic cross-sectional view in a chamber (1) of a venting system according to one preferred variant of the invention, intended for a fuel tank (10-schematically illustrated) and meeting the criteria of variant 1A described above. This chamber (1) comprises drainage openings (2) sealed by a non-return valve (3), which is an umbrella valve. This valve is represented therein in its leaktight closure position which is forced using a float (4) attached to a lever arm (5) comprising supports (6) positioned so as to be able to exert a pressure on the edge of the valve (3) when the liquid level in the tank (10) brings the float into the position illustrated.

In the absence of fuel in the tank (10), the arm (5) is in a vertical position, and the chamber (1) may be emptied by deformation of the umbrella valve membrane. When the level of fuel in the tank (10) reaches a certain limit, the float (4) lifts the lever arm (5) and the supports (6) prevent the deformation of the umbrella and therefore improve the leaktightness of the chamber (1). This is the position illustrated in this figure (it is only the fuel level that is not represented therein).

Figure 2:
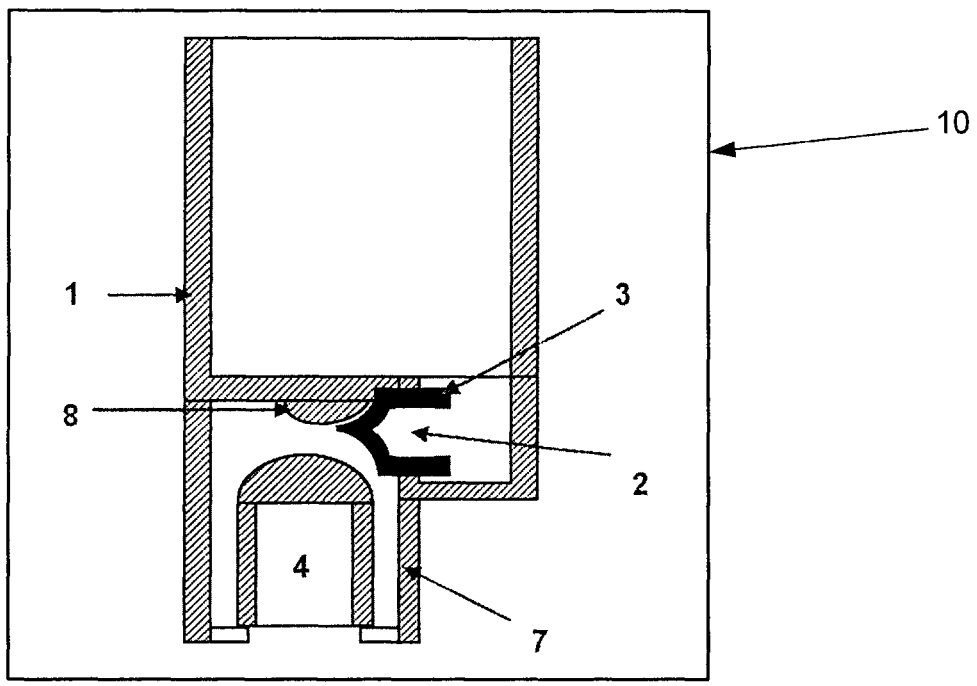
FIG. 2 is a schematic drawing of an embodiment of the present invention.

FIG. 2 also illustrates a schematic cross-sectional view in a chamber (1) of a venting system according to one preferred variant of the invention, but where the non-return valve (3) is this time a duck bill valve and where the float is no longer attached to a lever arm, but on the other hand, slides into a secondary chamber (7) provided with a stop (8). This variant corresponds to the criteria of variant (2) described above. In the absence of fuel in the tank, (10) the float (4) is in a low position, and the chamber (1) may be emptied, if necessary, by opening the lips of the duck bill. When the level of fuel in the tank (10) reaches a certain limit, the float (4) rises and the duck bill (3) is sandwiched between the float (4) and the stop (8), thus preventing its lips from opening. The view illustrated is that of the valve in a closed, but not leaktight, position, i.e. capable of discharging fuel if there were any trapped in the chamber (1).

Figure 3:
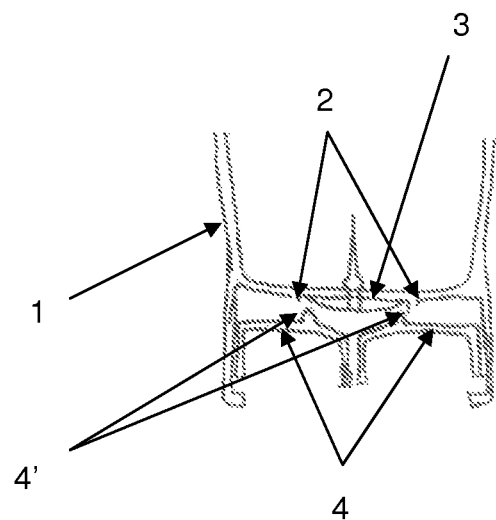
FIG. 3 is a schematic drawing of an embodiment of the present invention.

FIG. 3 illustrates a chamber corresponding to the criteria of variant (1B) described above. It comprises an umbrella valve (3) and an annular float (4) provided with an apex (4') that is also annular, the size and position of which are adapted in order to be able to press on the edge of the umbrella in the top position of the float. This float slides into an excrescence of the chamber (1) located under the latter, centered with respect to its apertures and open via the bottom (in order to be able to be emptied).

Figure 4:
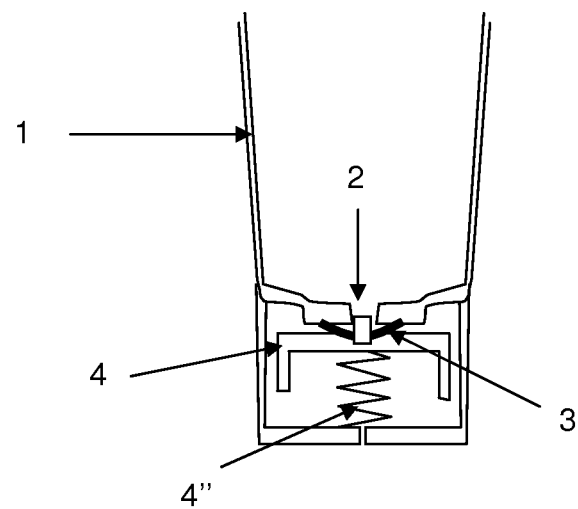
FIG. 4 is a schematic drawing of an embodiment of the present invention.

FIG. 4 illustrates a chamber according to variant (3) described above. The non-return valve with which it is provided is a float (4) comprising a spring (4") and being provided with an elastomeric part in the shape of an umbrella (3) inverted at its apex. As explained previously, such a chamber is open at rest, whereas those of the other figures are closed at rest. As in the preceding figure, the float (4) slides into an excrescence located under the chamber (1), and provided with an aperture enabling it to be emptied.

The invention claimed is:

1. A fuel tank equipped with a liquid tank venting system comprising:
    a chamber that is inside the fuel tank and that is equipped with a drainage device, the drainage device including
        at least one draining opening made in the chamber, and
        a non-return valve including an elastomeric part, the non-return valve being capable of sealing/freeing the draining opening; and
    at least one vent valve including a vent float,
    wherein the non-return valve is forced into a position for leaktight closure of the draining opening via the vent valve starting from a certain liquid level in the fuel tank,
    wherein the elastomeric part of the non-return valve is one of an umbrella valve or a duck bill valve,
    wherein the non-return valve is located on a perimeter of the draining opening in the chamber,
    wherein said non-return valve comprises at least one part that is deformable when a weight of liquid present in the chamber is applied thereon, such that when the at least one part is deformed, the draining opening is free,
    wherein the vent float of the vent valve is a closure float that moves as a function of the liquid level in the fuel tank and that acts directly or indirectly on the elastomeric part of the valve,
    wherein the non-return valve is an umbrella valve, and
    wherein the vent valve further includes
        a lever arm activated by the closure float, and
        at least one excrescence or support that exerts pressure on an edge of the umbrella valve starting from the certain liquid level in the fuel tank.

2. The fuel tank according to claim 1, wherein the non-return valve is located under the chamber or in an extension of the chamber, and
    wherein the vent float is a preloaded float having the elastomeric part of the non-return valve attached to an upper part thereof, the elastomeric part sealing the draining opening in the chamber depending on the liquid level in the fuel tank.

3. The fuel tank according to claim 1, wherein the vent float is an annular float including an annular apex, a size and position of the apex being such that the apex presses on an edge of the umbrella valve in a top position of the float, said float sliding into an excrescence of the chamber that is open at a bottom portion of the chamber.

4. The fuel tank according to claim 1, wherein the vent valve is separate from the chamber and connected to the chamber by a ventilation duct.

5. The fuel tank according to claim 1, wherein the vent valve is integrated into the chamber.

* * * * *